United States Patent [19]

Jahn et al.

[11] Patent Number: 4,969,664
[45] Date of Patent: Nov. 13, 1990

[54] DEVICE FOR THE VERTICAL ADJUSTMENT OF AN UPPER SAFETY BELT FITTING

[75] Inventors: Walter Jahn, Ehningen; Ralf Bogner, Neuhausen, both of Fed. Rep. of Germany

[73] Assignee: Daimler-Benz AG, Fed. Rep. of Germany

[21] Appl. No.: 436,040

[22] Filed: Nov. 14, 1989

[30] Foreign Application Priority Data

Dec. 23, 1988 [DE] Fed. Rep. of Germany ....... 3843523

[51] Int. Cl.⁵ ............................................. B60R 22/20
[52] U.S. Cl. ...................................... 280/808; 297/483
[58] Field of Search ............... 280/801, 802, 804, 808; 297/483, 468, 469, 484

[56] References Cited

U.S. PATENT DOCUMENTS

| | | | |
|---|---|---|---|
| 4,536,011 | 8/1985 | Ono | 280/808 |
| 4,550,933 | 11/1985 | Patterson | 280/808 |
| 4,652,012 | 3/1987 | Biller et al. | 280/808 |
| 4,711,498 | 12/1987 | Adomeit | 280/808 |

FOREIGN PATENT DOCUMENTS 3733026 4/1989 Fed. Rep. of Germany .

Primary Examiner—Kenneth R. Rice
Attorney, Agent, or Firm—Evenson, Wands, Edwards, Lenahan & McKeown

[57] ABSTRACT

In a vertically displaceable safety belt fitting, to ensure that, even when high displacement forces occur, a first catch element of the slideably displaceable anchoring element received by a guide rail fixed to the vehicle body executes a downwardly directed movement after it has run up against an associated pawl and after an actuating button has been released, whereby, when the button is depressed again, the first catch element becomes capable of moving the associated pawl away, it is proposed to equip a release element carrying the first catch element with an upwardly directed slot on the same side as the bearing and to provide the release element with a spring which engages on the top side of the release element.

2 Claims, 1 Drawing Sheet

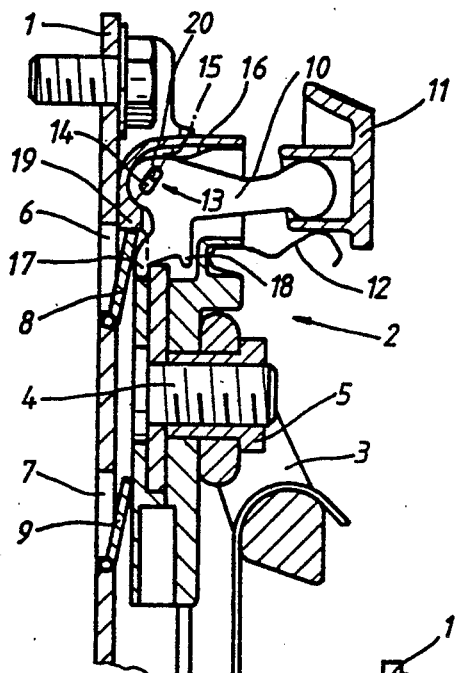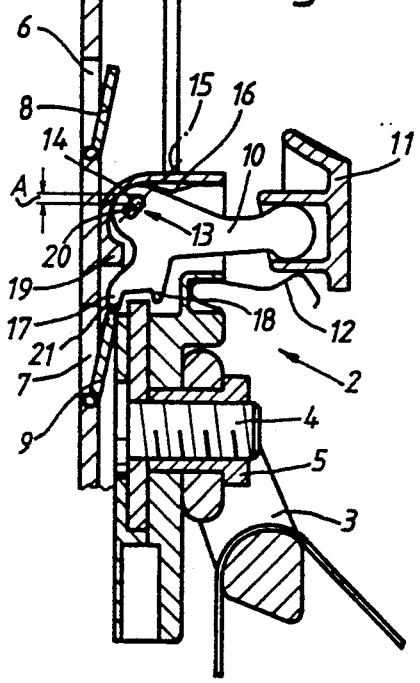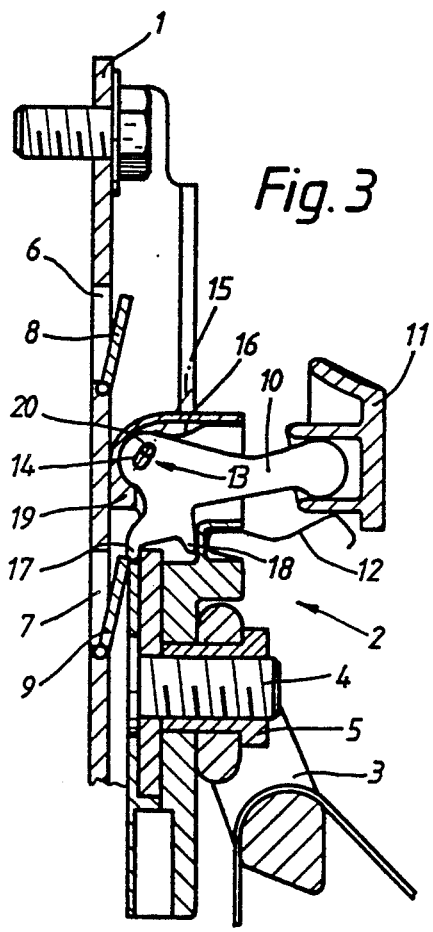

DEVICE FOR THE VERTICAL ADJUSTMENT OF AN UPPER SAFETY BELT FITTING

BACKGROUND AND SUMMARY OF THE INVENTION

The present invention generally relates to a device for the vertical adjustment of an upper safety belt fitting of a motor vehicle, and more particularly to such a device including a guide rail fixable to a vehicle body, an anchoring element which is received displaceably by the guide rail and a catch arrangement including several deflectable pawls spaced from one another in a longitudinal direction of the guide rail, a first catch element interacting with these several deflectable pawls, assigned to the anchoring element and formed on a lever shaped and spring loaded release element pivotable counter to a spring force for the deflection of the pawls, and a second catch element which is constructed on the anchoring element and which is supported on a particular pawl, after a backward pivoting of the release element and a downward movement of the anchoring element.

A vertical adjustment of this type is the subject of German Published, Unexamined Patent Application No. 3,733,026 and is intended to ensure that a controlled shift from catch to catch takes place during an adjusting movement directed downwards. Since, during this movement cycle, a panel covering the belt exit orifice in an associated trim component is also moved along and certain difficulties of movement sometimes occur because of tolerances associated with this, it sometimes happens that passengers not familiar with the functioning of the mechanism are unable to move the safety belt fitting downwards more than one notch. The reason for this is that, after the first catch element has run up against the end face of the associated pawl and a button acting on the release element has been released, although the release element pivots backwards and the supporting effect is cancelled, nevertheless it is not possible to bring about a further downward movement via the button because, when the button is depressed again, the release element is pivoted out of the preceding position once more and a new supporting effect at the first catch element therefore takes place.

A downward movement is, however, a precondition for ensuring that the first catch element travels downwards a certain amount from the end face of the associated pawl, so that when the button is depressed again the pawl is moved aside, with the result that the second catch element can also be moved past. For users familiar with the mechanics of the mechanism, it would be possible in the case of a supporting effect which cannot be cancelled to bring about a downward movement as far as the run up of the second catch element by pressing the panel downwards, with the button released. However, such a procedure is unacceptable.

An object of the invention is to provide improved operating reliability of an adjusting device of a seat belt, so that, even when a high adjustment resistance occurs, untrained users too are able to select specific heights in a controlled way during a downward movement.

This and other objects are achieved by advantageous embodiments of the present invention since it is ensured that, when a button is released and a supporting effect cancelled, a slight downward movement of a release element takes place. Further, when the button is depressed once more and the release element is consequently pivoted inwards, the associated catch is pressed away by the latter, thereby making a further downward movement possible.

A further functional improvement is obtained according to advantageous embodiments if, as the release element is pivoted inwards, a longitudinal mid-axis of a slot of a pivot bearing of the release element is in a position rotated approximately 45° out of the vertical in the clockwise direction, and if, in this position, a force exerted by a spring of the release element is transmitted in the direction of the longitudinal mid-axis of the slot.

Other objects, advantages and novel features of the present invention will become apparent from the following detailed description of the invention when considered in conjunction with the accompanying drawings

BRIEF DESCRIPTION OF THE DRAWINGS

FIGS. 1 to 3 show diagrammatic longitudinal sections through the device in different displacement positions.

DETAILED DESCRIPTION OF THE DRAWINGS

An exemplary embodiment of the invention is explained in detail below by means of the drawings.

A load bearing guide rail 1, fastened in a way not shown to a B column of a motor vehicle, possesses on the inside, a linear guide track for a slideably displaceable anchoring element 2. A safety belt fitting 3 is anchored pivotably to this by a screw bolt 4 and a sleeve shaped screw nut 5.

The guide rail 1, on a side thereof bearing against the B column, has several rectangular orifices, of which only two orifices 6 and 7 are shown. The lower edge of each orifice 6 and 7 is designed as a pivot bearing for a plate shaped pawl 8 and 9, spring loaded in a way not shown, so that these pawls 8 and 9 are arranged pivotably between an inclined catching position and an approximately vertical release position, in which the pawls 8 and 9 retract into the orifices 6 and 7.

A lever shaped release element 10 is pivotably received by the anchoring element 2 and can be pivoted downwards counter to the force of a spring 12 by operation of a button 11. A pivot bearing 13 of the release element 10 possesses a slot 14 which is assigned to the release element 10 and has a longitudinal mid-axis 15 which is deflected approximately 45° out of the vertical when the button 11 is pressed downwards as a result of rotation in a clockwise direction. In this deflected position of the release element 10, the force exerted by a spring 16 acts in the direction of the longitudinal mid-axis 14.

Formed on the release element 10 are a first catch element 17 and a stop 18, the latter, by running up against the anchoring element 2, limiting the downward movement of the button 11. A second catch element 19 forming an integral part of the anchoring element 2 serves for non-positive support between the guide rail 1 and the anchoring element 2.

This support function of the second catch element 19 is shown in FIG. 1 by the abutment of element 19 on pawl 8. The release element 10 is pivoted outwards, the first catch element 17 resting against the anchoring element 2 and thus limiting the backward pivoting movement of the release element 10 caused by the spring 12 with the button 11 not subjected to any load, presses on the release element 10 from above, so that a pivot pin 20, fixed to the anchoring element 2, rests against the upper limiting wall of the slot 14.

When, starting from FIG. 1, the button 11 is moved downwards, the release element 10 pivots about the pivot pin 20 in the clockwise direction and the first catch element 17 presses the pawl 9 aside. When the stop 18 of the release element 10 comes to bear on the anchoring element 2, the pawl 8 is retracted into the orifice 6 assigned to it, with the result that the supporting function between the pawl 8 and the second catch element 19 is cancelled.

The anchoring element 2 is now set in downward motion, until the first catch element 17 strikes against the end face 21 of the pawl 9, as shown in FIG. 2. Initially, an upward movement of the release element 10, caused by the slot 14, by an amount "A" in the upward direction takes place counter to the force of the spring 16, until the downward movement of the anchoring element 2 is halted because the pivot pin 20 runs up against the lower limiting wall of the slot 14. This situation is shown in FIG. 2.

When the button 11 is released, because of the dead weight of the anchoring element and the pull of the belt bank caused by a belt reeling device,e which is not shown, a further downward movement of the anchoring element 2 usually takes place. After a backward pivoting of the release element 10 so that the supporting effect of the first catch element 17 is cancelled thereby, the second catch element 19 runs up against the associated pawl 9. Starting from this position, it is then possible, further downwards, by depressing the button 11 once more and by means of the movement cycle initiated thereby described above, to move the anchoring element 2.

If no such displacement action occurs, for example because the frictional influences are too high, after the supporting function originating from the first catch element 17 has been cancelled, the release element 10 is displaced downwards by the amount "A", so that the release element 10 is now once again transferred into its stable initial position which is brought about as a result of the effect of the spring 16 and in which the pivot pin 20 rests against the upper limitation of the slot 14. The first catch element 17 thus covers the pawl 9, with the result that, when the button 11 is depressed, the pawl 9 is pivoted away and a further downward movement of the anchoring element 2 can take place, the displacement movement already commencing when the button 11 is being actuated.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Device for the vertical adjustment of an upper safety belt fitting in a motor vehicle, comprising:

a guide rail fixable to a vehicle body;

an anchoring element which is received displaceably by the rail and to which the safety belt fitting is fastened;

a lever shaped and spring loaded release element pivotable counter to a spring force for deflecting the pawls;

a first catch element interacting with these several pawls and assigned to the anchoring element and the lever shaped and spring loaded release element; and a second catch element which is constructed on the anchoring element and which, after a backward pivoting of the release element and a downward movement of the anchoring element, is supported on a particular pawl, wherein a pivot bearing of the release element possesses a slot, wherein during a downward adjusting movement, when the first catch element abuts an end face of one of the pawls, under a further force effect the first catch element travels upwards counter to the force of a spring by an amount limited by a slot, and wherein during a backward pivoting of the release element and a cancellation of the supporting function of the pawl, the release element is displaced downwards by the amount limited by the slot.

2. Device according to claim 1, wherein, with the release element pivoted inwards, a longitudinal mid-axis of the slot is in a position rotated approximately 45° out of the vertical in the clockwise direction, and wherein, in this position, the force exerted by the spring is transmitted in a direction of the longitudinal mid-axis.

* * * * *